United States Patent
Lichstein et al.

[15] 3,696,150
[45] Oct. 3, 1972

[54] HALOGEN-EXCHANGE FLUORINATION OF ORGANIC COMPOUNDS USING AMMONIUM FLUORIDE

[72] Inventors: Bernard M. Lichstein, Elizabeth; Cyril Woolf, Morristown, both of N.J.

[73] Assignee: Allied Chemical Corporation, New York, N.Y.

[22] Filed: Feb. 16, 1970

[21] Appl. No.: 11,908

[52] U.S. Cl. ............... 260/544 F, 260/389, 260/463, 260/611 A, 260/612 R, 260/649 F
[51] Int. Cl. ......................... C07c 51/58, C07c 17/20
[58] Field of Search....260/544 F, 544 K, 463, 649 F, 260/612 R, 611 A

[56] References Cited

UNITED STATES PATENTS 2,836,622  5/1958  Tullock ..................... 260/544
2,757,214  7/1956  Muetterties ............... 260/653
2,238,242  4/1941  Bolon ....................... 260/649

OTHER PUBLICATIONS

Okazaki. Chemical Abstracts. Vol. 70, p. 90810n (1969) abstract of Nippon Kagaku Fasshi 1968 (89,11).

*Primary Examiner*—Lorraine A. Weinberger
*Assistant Examiner*—Richard D. Kelly
*Attorney*—Arthur J. Plantamura and Stanley M. Teigland

[57] ABSTRACT

Compounds having a nonfluorine halogen atom attached to a carbon atom which in turn is bonded to two phenyl groups, or doubly bonded to an oxygen atom, are fluorinated by reaction with ammonium fluoride or ammonium bifluoride, whereby the halogen atom is replaced by fluorine.

9 Claims, No Drawings

HALOGEN-EXCHANGE FLUORINATION OF ORGANIC COMPOUNDS USING AMMONIUM FLUORIDE

BACKGROUND OF THE INVENTION

This invention relates to halogen-exchange fluorination of organic compounds containing a nonfluorine halogen atom.

It is often desirable to convert an organic compound containing a halogen atom which is not fluorine to the corresponding compound wherein the halogen atom is replaced by fluorine. For example, it is desirable to have a convenient method for converting phosgene to carbonyl fluoride, which is especially valuable as a reactant in preparing functional organic compounds containing fluorine.

It is an object of this invention to provide a convenient method for fluorinating organic compounds containing a nonfluorine halogen atom.

SUMMARY OF THE INVENTION

In accordance with this invention, compounds having a halogen atom selected from the group consisting of chlorine, bromine, and iodine attached to a carbon atom which in turn is bonded to two phenyl groups, or doubly bonded to an oxygen atom, are fluorinated by being reacted with ammonium fluoride or ammonium bifluoride, whereby the halogen atom is replaced by fluorine. The substituent accounting for the fourth valence of the carbon atom bearing the halogen atom to be replaced is not especially critical and can be any substituent which does not interfere with the fluorination reaction.

Compounds which can be fluorinated in accordance with this invention can be represented by the general formula

wherein X is chlorine, bromine or iodine and Y is selected from the group consisting of halogen (fluorine, chlorine, bromine, and iodine), lower alkoxy, phenoxy, phenyl, and alkyl, alkenyl, and alkynyl radicals having from one to 18 carbon atoms; or by the general formula

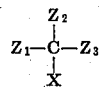

wherein X is chlorine, bromine or iodine, $Z_1$ and $Z_2$ are phenyl, and $Z_3$ is halogen (fluorine, chlorine, bromine, or iodine), hydrogen, lower alkoxy, an alkyl radical having one to 10 carbon atoms, phenoxy, or phenyl.

As used herein, the terms lower alkyl and lower alkoxy refer to such groups having one to six carbon atoms, and the term "phenyl" includes phenyl groups bearing substituents which do not substantially detract from the electron-withdrawing nature of the phenyl group, such as lower alkyl and lower alkoxy groups, and electron-withdrawing groups, such as halogen and nitro. Similarly, as used herein, the terms "alkyl," "alkenyl" and "alkynyl" include such groups containing substituents which do not interfere with the fluorination reaction, such as halogen atoms.

We have found that neither ammonium fluoride nor ammonium bifluoride affect carbon-carbon unsaturation under the conditions at which the process of this invention is conducted. Hence, the process of this invention can advantageously be employed to fluorinate unsaturated compounds with substantially the same facility as the corresponding saturated analogs. For example, such compounds as chloropropynoyl bromide and oleoyl chloride can be fluorinated in accordance with this invention.

In the preferred embodiments of this invention: X is chlorine or bromine, preferably chlorine; Y is chlorine, fluorine, lower alkoxy, phenyl, or an alkyl radical having one to eight carbon atoms; and $Z_3$ is chlorine, bromine, hydrogen or phenyl, preferably phenyl. Examples of compounds which can be fluorinated in accordance with this invention include diphenylchloromethane, triphenylchloromethane, triphenylbromomethane, triphenyliodomethane, phosgene, carbonyl chlorofluoride, acetyl chloride, trichloroacetyl bromide, benzoyl chloride, decanoyl chloride, phenylchloroformate, lower alkyl esters of chloroformic acid, and the like.

The fluorination reaction proceeds readily at room temperature and atmospheric pressure. If desired, the reaction can be carried out at temperatures as low as about −60° C and as high as about 200° C. The preferred temperature range is from about 0° C to about 150° C. The reaction can also be carried out at pressures above or below atmospheric if desired. For example, if the compound to be fluorinated is especially volatile, it may be desirable to carry out the reaction at pressures above atmospheric.

It is normally not necessary to carry out the reaction in the presence of an inert diluent, but if the reaction is exothermic, it is preferable to do so in order to moderate the reaction. Also, in the absence of a diluent, the ammonium halide by-product which is formed may tend to inhibit the reaction by depositing on unreacted ammonium fluoride or ammonium bifluoride. The diluent can be simply a suspending agent, but preferably it is a solvent for the compound to be fluorinated. Suitable diluents include acetonitrile, dimethyl-formamide, dimethylsulfoxide and carbon tetrachloride.

Ammonium fluoride ($NH_4F$) and ammonium bifluoride ($NH_4F \cdot HF$) are well known compounds and are relatively inexpensive compared with other sources of fluorine, which makes the process of this invention an especially advantageous method of fluorination. Ammonium fluoride generally gives preferred results with the diphenyl compounds, and, conversely, ammonium bifluoride generally gives preferred results with the carbonyl compounds.

The following examples further illustrate the invention.

EXAMPLE 1

A mixture of 20 grams of ammonium fluoride and 150 ml of acetonitrile was charged to a reaction flask which was fitted with a Dry Ice condenser, which in turn was connected to a cold trap which was maintained at about −196° C. Over a period of two hours, 33.6 grams of phosgene were introduced into the reaction mixture, which was vigorously stirred. The mixture was then successively heated to 60° C, cooled to 35° C, and subjected to a vacuum. Volatiles which had passed through the condenser during the reaction and during the evacuation of the flask were collected in the cold trap. Gas chromatographic analysis and infrared spectrum analysis indicated that the trap contained carbonyl fluoride in an amount corresponding to a 46 percent yield and carbonyl chlorofluoride in an amount corresponding to a 10 percent yield.

EXAMPLE 2

A 500 ml Monel flask fitted with a Dry Ice condenser was charged with 57.1 grams of ammonium bifluoride and 175 ml of acetonitrile. As the reaction mixture was stirred, 84.0 grams of phosgene were introduced into the mixture over a period of 90 minutes. Upon completion of the addition of the phosgene, the temperature of the mixture had risen to a maximum of 37° C. The mixture was then maintained at 70° C for one hour. Product which evolved during the reaction was collected in a cold trap maintained at −196° C. Additional product was collected in the cold trap by evacuating the system. Gas chromatographic analysis and infrared spectrum analysis indicated that the trap contained carbonyl fluoride in an amount corresponding to a yield of 89.8 percent and carbonyl chlorofluoride in an amount corresponding to a yield of 7.6 percent.

EXAMPLE 3

A mixture of 23.8 grams of triphenylchloromethane, 4.0 grams of ammonium fluoride and 100 ml of dimethylformamide was heated to 105° C over a period of 30 minutes and maintained at that temperature for 4.5 hours, with vigorous stirring being maintained during the reaction period. Solids were removed by filtration. The addition of ether to the filtrate gave additional solids which were also removed by filtration. The filtrate was then poured onto ice, which produced 15.8 grams of a white solid, melting point 101°–101.5° C, which was recovered by filtration. The white solid was identified as triphenylfluoromethane by infrared spectrum and elemental analyses. The yield was 71 percent.

EXAMPLE 4

A mixture of 35.0 grams of ethyl chloroformate and 15.0 grams of ammonium fluoride was stirred vigorously and heated, first to 65° C and then to 85° C, until all the liquid had distilled out of the reaction flask. The product was redistilled and a fraction boiling at 58°–59 C was obtained. This fraction was identified by nuclear magnetic resonance to be ethyl fluoroformate and was shown to be 98 percent pure by gas chromatography. About 5.6 grams of unreacted ethyl chloroformate was also recovered. The yield of ethyl fluoroformate based on the amount of ethyl chloroformate consumed was 39 percent.

EXAMPLE 5

To a flask containing 30 grams of ammonium bifluoride were added 44.8 grams of acetyl bromide over a period of 25 minutes. The reaction mixture was then maintained at 56° C for 90 minutes and the vapors which evolved were collected in a Dry Ice trap connected to the flask. The material collected in the trap was distilled and the fraction boiling at 19°–21° C was recovered and identified by infrared spectrum analysis as acetyl fluoride. The yield was 42.5 percent.

EXAMPLE 6

Thirty grams of acetyl bromide were added to 10 grams of ammonium fluoride over a period of 18 minutes. The reaction mixture was then maintained at 80° C for 3 hours and the product was distilled from the reaction mixture during this period as it was formed. A total of 1.4 grams of acetyl fluoride (identified by infrared spectrum analysis) were recovered.

EXAMPLE 7

A mixture of 10 grams of ammonium fluoride, 40 grams of triphenylbromomethane and 200 ml of acetonitrile was maintained, with stirring, at 81° C for 4 hours. Solids were removed by filtration and the filtrate was subjected to a vacuum at 40° C to remove the solvent. The product, recovered by recrystallization of the residue from n-hexane, had a melting point of 100.5°–101.5° C and was identified by infrared spectrum and elemental analyses as triphenylfluoromethane. The yield was 84.7 percent.

EXAMPLE 8

To a flask containing 35 grams of ammonium bifluoride and 175 ml of acetonitrile was added 73.5 grams of benzoyl chloride over a period of 2 hours. The temperature of the reaction mixture was raised to 82° C during the addition and was maintained at that temperature for an additional 3 hours after the addition was completed. Solids were recovered by filtration and the solvent was removed from the filtrate by distillation at atmospheric pressure. The residue was distilled at 58°–61 C at 80 mm Hg to afford the product, which was 98 percent pure and identified by infrared spectrum analysis as benzoyl fluoride. The yield was 39.2 percent.

EXAMPLE 9

A mixture of 25 grams of ammonium bifluoride and 51 grams of isovaleryl bromide was stirred for 3 hours. During this period the temperature of the mixture was gradually raised up to 155° C and the product was distilled from the mixture and collected in a cold trap. The material collected in the trap was redistilled to afford the product, boiling point 80°–82° C, which was identified by infrared spectrum analysis as isovaleryl fluoride. The yield was 48.7 percent.

We claim:

1. A method of fluorinating a compound having the formula

wherein X is chlorine, bromine or iodine and Y is selected from the group consisting of halogen, phenyl, and alkyl, alkenyl, and alkynyl radicals having from one to 18 carbon atoms; or a compound having the formula

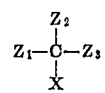

wherein X is chlorine, bromine or iodine, $Z_1$ and $Z_2$ are phenyl, and $Z_3$ is halogen, lower alkoxy, hydrogen, an alkyl radical having one to 10 carbon atoms, phenoxy or phenyl, which method comprises reacting the compound with ammonium fluoride or ammonium bifluoride at a temperature of from $-60°$ C to about $200°$ C, whereby X is replaced by fluorine.

2. The method of claim 1 wherein the compound has the formula

3. The method of claim 2 wherein Y is chlorine, fluorine, phenyl or an alkyl radical having one to eight carbon atoms.

4. The method of claim 3 wherein X is chlorine or bromine.

5. The method of claim 1 wherein the compound has the formula

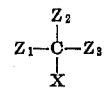

6. The method of claim 5 wherein $Z_3$ is chlorine, bromine, hydrogen or phenyl.

7. The method of claim 6 wherein X is chlorine or bromine.

8. The method of claim 6 wherein $Z_3$ is phenyl.

9. The method of claim 8 wherein X is chlorine or bromine.

* * * * *